(12) United States Patent
Kim

(10) Patent No.: US 8,653,418 B2
(45) Date of Patent: Feb. 18, 2014

(54) DEVICE FOR CONNECTING WELDING WIRE FOR $CO_2$ GAS WELDING

(75) Inventor: Jin-Gun Kim, Pusan (KR)

(73) Assignee: Sungwoo Hitech Co., Ltd., Pusan (KR)

( * ) Notice: Subject to any disclaimer, the term of this patent is extended or adjusted under 35 U.S.C. 154(b) by 57 days.

(21) Appl. No.: 13/325,399

(22) Filed: Dec. 14, 2011

(65) Prior Publication Data

US 2012/0168414 A1 Jul. 5, 2012

(30) Foreign Application Priority Data

Dec. 29, 2010 (KR) .................. 10-2010-0138012

(51) Int. Cl.
*B23K 9/28* (2006.01)

(52) U.S. Cl.
USPC ......... 219/138; 219/56; 219/56.1; 219/56.21; 219/56.22; 219/57; 140/112

(58) Field of Classification Search
USPC ............... 140/112; 219/138, 56, 56.1, 56.21, 219/56.22, 57, 161, 158, 101, 107, 58
See application file for complete search history.

(56) References Cited

U.S. PATENT DOCUMENTS

| | | | | |
|---|---|---|---|---|
| 2,051,900 A * | 8/1936 | Rosner | .......................... | 29/412 |
| 2,115,649 A * | 4/1938 | Stahl | ............................ | 228/170 |
| 2,115,652 A * | 4/1938 | Stahl | ............................ | 269/270 |
| 2,756,308 A * | 7/1956 | Powell | ............................ | 219/57 |
| 2,784,297 A * | 3/1957 | Pityo | ................................ | 219/58 |
| 2,796,511 A * | 6/1957 | Steele | ......................... | 219/85.14 |
| 3,166,665 A * | 1/1965 | Neukom et al. | ............... | 219/104 |
| 3,259,969 A * | 7/1966 | Tessmann | ...................... | 228/125 |
| 3,309,766 A * | 3/1967 | Rozmus | ......................... | 228/115 |
| 3,314,583 A * | 4/1967 | Marmaduke | ................... | 228/2.3 |
| 3,340,596 A * | 9/1967 | Rozmus | ......................... | 228/115 |
| 3,372,263 A * | 3/1968 | Lemelson | ....................... | 219/80 |
| 3,384,731 A * | 5/1968 | Draving | ........................... | 219/57 |
| 3,394,241 A * | 7/1968 | Sparrow et al. | ................ | 219/118 |
| 3,487,188 A * | 12/1969 | Draving | ........................... | 219/57 |
| 3,514,574 A * | 5/1970 | Forschler | ...................... | 219/103 |
| 3,590,207 A * | 6/1971 | Cox | ........................... | 219/85.15 |
| 3,621,176 A * | 11/1971 | Valente | ........................... | 219/57 |
| 3,653,571 A * | 4/1972 | Rozmus et al. | ................. | 228/3.1 |
| 3,707,865 A * | 1/1973 | Oriani | ............................. | 72/340 |
| 3,751,621 A * | 8/1973 | Maier | ........................... | 219/103 |
| 3,802,061 A * | 4/1974 | Teague et al. | .................. | 228/115 |

(Continued)

FOREIGN PATENT DOCUMENTS

| | | |
|---|---|---|
| CN | 2120654 U | 11/1992 |
| KR | 20-2009-0007017 U | 7/2009 |
| KR | 10-2010-0085296 A | 7/2010 |

OTHER PUBLICATIONS

Search Report for Chinese Application No. 2011104151844; dated Nov. 26, 2013.

*Primary Examiner* — Henry Yuen
*Assistant Examiner* — Jimmy Chou
(74) *Attorney, Agent, or Firm* — Alston & Bird LLP

(57) ABSTRACT

A device for connecting welding wires for $CO_2$ gas welding includes a base frame, first and second electrode plates that are disposed apart from each other on the base frame and including disposing grooves to which an old wire and a new wire are respectively disposed, and clampers that are disposed to each electrode plate and that clamp the used wire and the new wire disposed to the disposing grooves, respectively.

12 Claims, 11 Drawing Sheets

(56) References Cited

U.S. PATENT DOCUMENTS

| | | | |
|---|---|---|---|
| 3,828,601 A * | 8/1974 | Tessmann | 72/334 |
| 3,847,323 A * | 11/1974 | Good et al. | 228/3.1 |
| 3,934,784 A * | 1/1976 | Tessmann | 228/125 |
| 4,049,414 A * | 9/1977 | Smith | 65/407 |
| 4,592,274 A * | 6/1986 | Tomatis | 99/452 |
| 4,779,789 A * | 10/1988 | Soltis | 228/104 |
| 4,960,043 A * | 10/1990 | van Lengerich | 99/353 |
| 5,126,159 A * | 6/1992 | Manser et al. | 426/549 |
| 5,542,868 A * | 8/1996 | Kozuka | 445/37 |
| 5,690,842 A * | 11/1997 | Panchison | 219/58 |
| 5,967,026 A * | 10/1999 | Nelles et al. | 99/453 |
| 5,993,187 A * | 11/1999 | Manser et al. | 425/202 |
| 6,588,646 B2 * | 7/2003 | Loprire | 228/110.1 |
| 7,078,644 B2 * | 7/2006 | Onishi | 219/56.22 |
| 7,227,095 B2 * | 6/2007 | Roberts et al. | 219/69.11 |
| 7,469,629 B2 * | 12/2008 | Fava et al. | 99/472 |
| 7,977,597 B2 * | 7/2011 | Roberts et al. | 219/69.17 |
| 2008/0089987 A1 * | 4/2008 | Horn | 426/510 |
| 2011/0311812 A1 * | 12/2011 | Haussmann | 428/373 |

\* cited by examiner

DEVICE FOR CONNECTING WELDING WIRE FOR CO$_2$ GAS WELDING

CROSS-REFERENCE TO RELATED APPLICATION

This application claims priority to and the benefit of Korean Patent Application No. 10-2010-0138012 filed in the Korean Intellectual Property Office on Dec. 29, 2010, the entire contents of which are incorporated herein by reference.

BACKGROUND OF THE INVENTION (a) Field of the Invention

The present invention relates to a device for connecting welding wires for CO$_2$ gas welding. More particularly, the present invention relates to a device for connecting welding wires for CO$_2$ gas welding that may connect an old wire and a new wire.

(b) Description of the Related Art

Generally, CO$_2$ gas welding is a semi-automatic or automatic arc welding process in which a continuous and consumable wire electrode and a shielding gas (CO$_2$) are fed for insulating a welding portion from air.

Particularly, when a welding gun does not reach a welding portion due to a complicated vehicle body structure and so on, the CO$_2$ gas welding process may be applied, and an automatic welding process with a robot also applies the CO$_2$ gas welding.

FIG. 1 is a drawing showing a conventional CO$_2$ gas welding apparatus. As shown in FIG. 1, in general CO2 gas welding process, a welding torch 105 is mounted to an arm 103 of a robot 101, and a welding wire 109 is supplied to the welding torch 105 from a wire drum 107 through a supplying line 115.

The welding torch 105 is connected to a CO$_2$ gas tank 111 through a gas line 113, and CO$_2$ gas is supplied to the welding torch 105 then discharged to the welding portion.

The welding torch 105 is connected to a CO$_2$ gas welding machine 110 to be supplied welding electric power.

In the CO2 gas welding process, welding quality is influenced by a matching state of the welding wire 109 and the welding portion, wire supplying speed, appropriate current and voltage adjusting, and so on.

During the CO2 gas welding, if the welding wire 109 within the wire drum 107 is completely used and the welding process is continued without preparation of complete exhaustion of the welding wire 109, productivity may be deteriorated due to having to restart the welding process, and faulty products may be generated.

Due to the problem, even if a large capacity wire drum for the welding wire 109 is used, in the mega-factory the welding wire replacement process is a burden.

Particularly, in the conventional art, when the welding wire 109 within the wire drum 107 is almost exhausted, residual welding wire 109 is replaced by a new welding wire 109 and the residual welding wire 109 is discarded to prevent the above problems.

Thus, replacement of the old welding wire 109 may increase unnecessary consumption of welding wire and welding cost.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device for connecting welding wires for CO$_2$ gas welding having advantages of connecting an old wire and a new wire.

A device for connecting welding wires for CO$_2$ gas welding according to an exemplary embodiment of the present invention may include: a base frame; first and second electrode plates that are disposed apart from each other on the base frame and including disposing grooves to which an old wire and a new wire are respectively disposed; and clampers that are disposed to each electrode plate and that clamp the used wire and the new wire disposed to the disposing grooves, respectively.

The device may further include a power supplier supplying electric power to each electrode plate, wherein the old wire and the new wire may be connected by electrical resistance heating through the electric power supplied from the power supplier.

The device may further include: a fixing member that is electrically insulated from the first electrode plate and is fixed to the base frame, and the first electrode plate is disposed thereon; and a moving member that is electrically insulated from the second electrode plate and is movably disposed to the base frame apart from the fixing member, and the second electrode plate is disposed thereon.

Each end of the old wire and the new wire may contact each other between the fixing member and the moving member.

The fixing member may be fixed to the base frame by an engage bolt.

The moving member may be movable along at least one guide bar connected to the fixing member.

The guide bar may be engaged to the base frame penetrating through the fixing member and the moving member.

The moving member may be disposed apart by a predetermined distance from the fixing member by a positioning member disposed between the moving member and the fixing member.

An elastic member may be disposed between the base frame and the moving member for elastically supporting the moving member and the elastic member may be disposed to the guide bar.

A stopper may be disposed to the base frame for limiting movement of the moving member.

The stopper may be a stopping bolt engaged to the base frame.

A device for connecting welding wires for CO$_2$ gas welding, of which the wires include an old wire and a new wire, may include: a base frame; a fixing member fixed to the base frame; a moving member that is movably disposed to the base frame apart from the fixing member; a first electrode plate that is electrically insulated from the fixing member and disposed on the fixing member and that includes a first disposing groove into which one of the wires is disposed; a second electrode plate that is electrically insulated from the moving member and disposed on the moving member and that includes a second disposing groove into which the other of the wires is disposed; clampers that are disposed to each electrode plate and that clamp each wire disposed to each disposing groove; a positioning member disposed between the moving member and the fixing member for maintaining the moving member apart by a distance from the fixing member; and an elastic member that is disposed between the base frame and the moving member for elastically supporting the moving member, wherein the old wire and the new wire may be connected by electrical resistance heating through supplied electric power from a power supplier.

A stopper may be disposed to the base frame for limiting movement of the moving member.

According to the exemplary embodiment of the present, although an old welding wire is exhausted and is replaced by a new welding wire, discarding residual welding wire is not required so that the welding cost may be reduced and productivity may be enhanced.

BRIEF DESCRIPTION OF THE DRAWINGS

Drawings are provided for better comprehension and ease of description However, it is to be understood that the invention is not limited to the disclosed drawings, but, on the contrary, is intended to cover various modifications.

DESCRIPTION OF SYMBOLS

Figure 1:
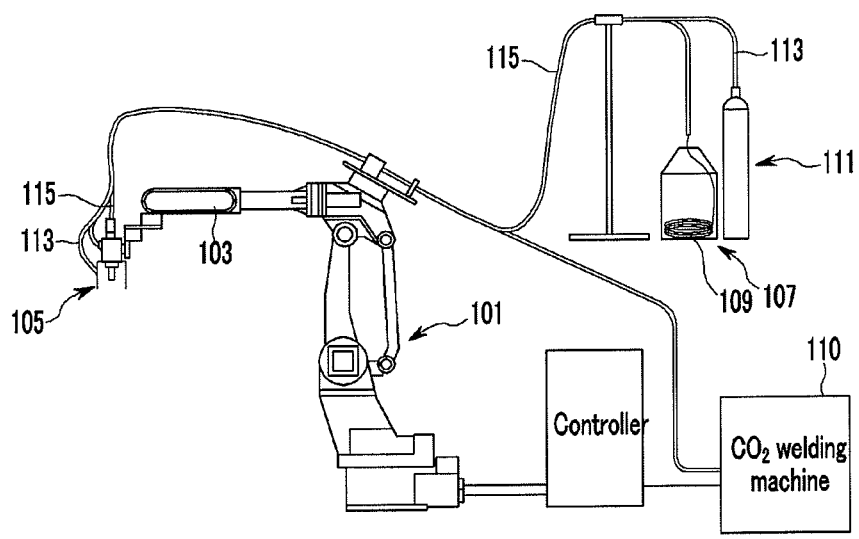
FIG. 1 is a drawing showing a conventional $CO_2$ gas welding apparatus.

| | |
|---|---|
| 10: base frame | 11: bottom plate |
| 13: vertical plate | 20: fixing member |
| 21: engage bolt | 30: moving member |
| 31: guide bar | 40: positioning member |
| 45: stopper | 46: stopping bolt |
| 50: elastic member | 60: first electrode plate |
| 61: first disposing groove | 70: second electrode plate |
| 71: second disposing groove | 80: clamper |
| 81: clamping lever | 83: clamping member |
| 90: power supplier | W1: first welding wire |
| W2: second welding wire | |

DETAILED DESCRIPTION OF THE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

For better comprehension and ease of description, parts unrelated to explanation may be omitted, and like numerals refer to like elements throughout the specification.

In the drawings, the thickness of layers, films, panels, regions, etc., are exaggerated for clarity.

Figure 2:
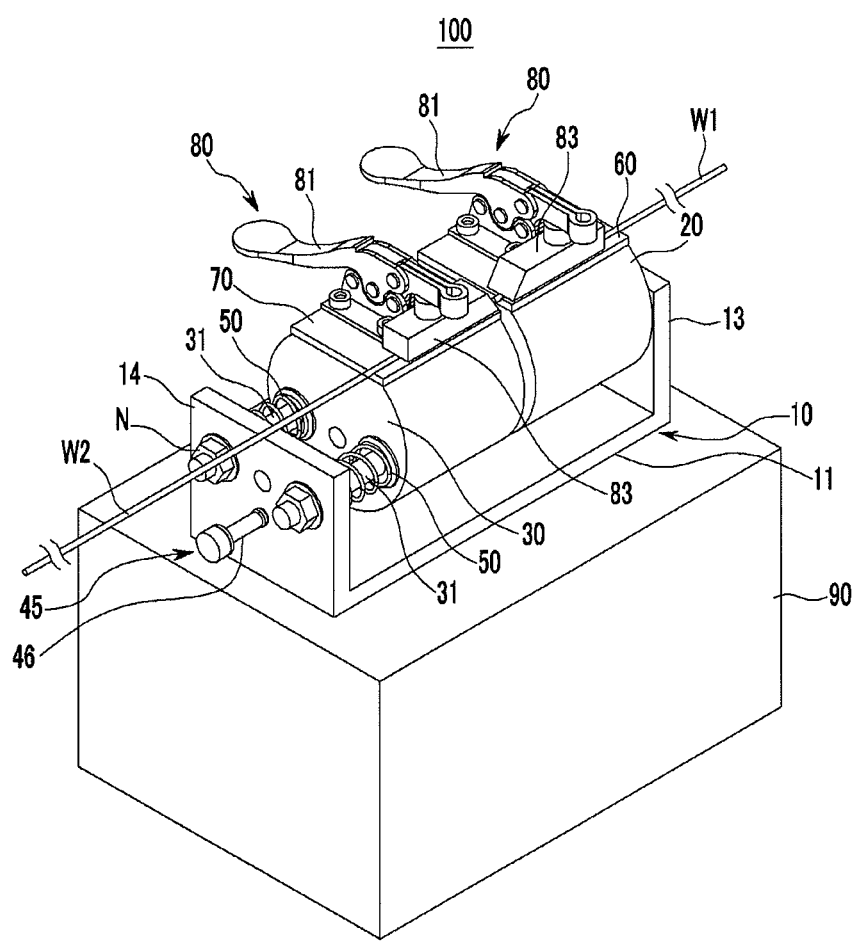
FIG. 2 is a perspective view of a device for connecting welding wires for a $CO_2$ gas welding apparatus according to an exemplary embodiment.
Figure 3:
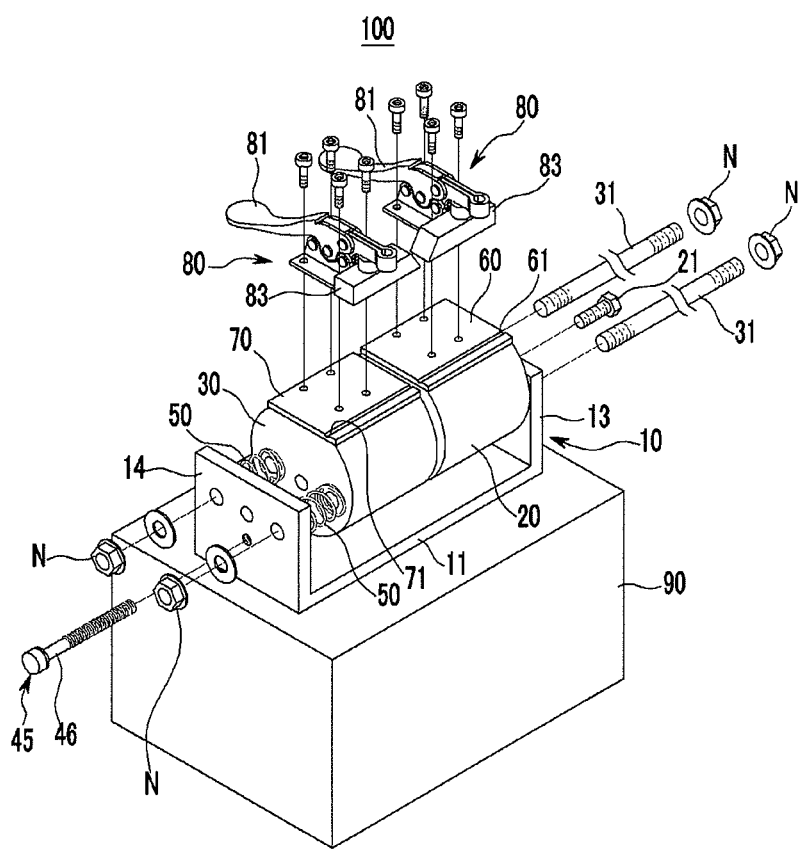
FIG. 3 is an exploded perspective view of FIG. 2.
Figure 4:
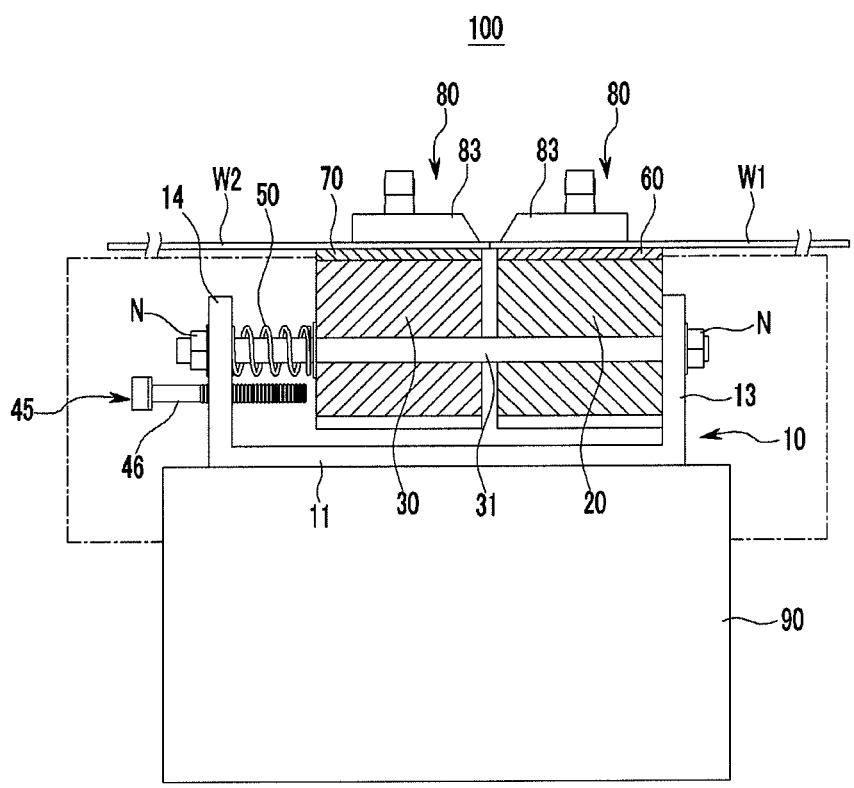
FIG. 4 is a front view of FIG. 2.
Figure 5:
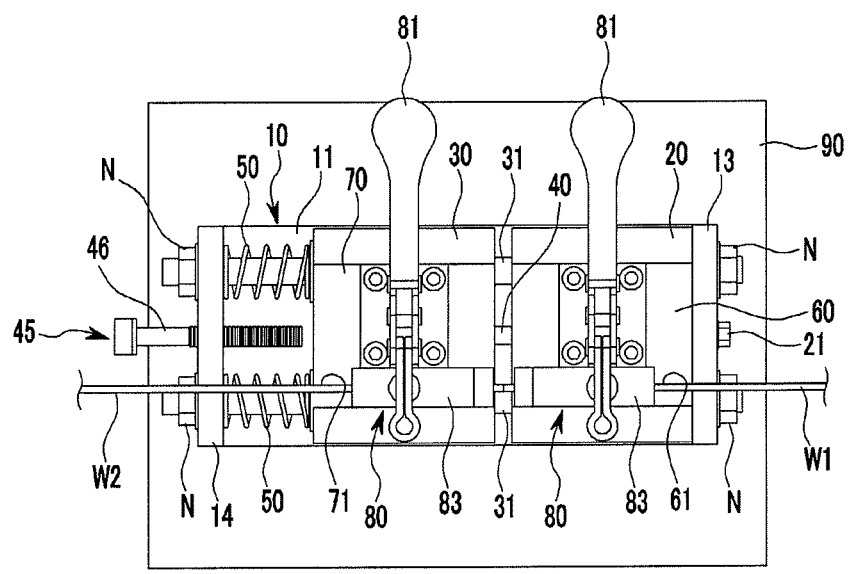
FIG. 5 is a plan view of FIG. 2.

FIG. 2 is a perspective view of a device for connecting welding wires for a $CO_2$ gas welding apparatus according to an exemplary embodiment, FIG. 3 is an exploded perspective view of FIG. 2, FIG. 4 is a front view of FIG. 2, and FIG. 5 is a plan view of FIG. 2.

Referring to the drawings, a $CO_2$ gas welding apparatus, as shown in FIG. 1, to which a welding wire connecting device according to an exemplary embodiment may be applied, includes a welding torch 105 that is mounted to an arm 103 of a robot 101, a welding wire 109 that is supplied to the welding torch 105, and a wire drum 107 in which the welding wire 109 is stored and that supplies it to the welding torch through a supplying line 115.

The welding torch 105 is connected to a $CO_2$ gas tank 111 through a gas line 113, and $CO_2$ gas is supplied to the welding torch 105 then discharged to the welding portion.

The welding torch 105 is connected to a $CO_2$ gas welding machine 110 to be supplied welding electric power.

In the exemplary embodiment of the present invention, remained welding wire W1 within the wire drum 107 and used will by denoted by "first welding wire", and new welding wire W2, which will be replaced, will be denoted by "second welding wire".

The connecting device 100 for the welding wires according to the exemplary embodiment of the present invention connects each end of the first welding wire W1 and the second welding wire W2 by electrical resistance heating.

The device for connecting welding wires 100 for $CO_2$ gas welding according to the exemplary embodiment of the present invention includes a base frame 10, a fixing member 20, a moving member 30, a first electrode plate 60, a second electrode plate 70, a clamper 80, and a power supplier 90.

The base frame 10 includes a bottom plate 11 and vertical plates 13 and 14 vertically connected to ends of the bottom plate 11.

The fixing member 20, formed as a block, is mounted to one vertical plate 13 of the base frame 10, and an engage bolt 21 may fix the fixing member 20 to the vertical plate 13.

The moving member 30, formed as a block, is apart from the fixing member 20 and movably disposed to the base frame 10.

The moving member 30 may be movable along at least one guide bar 31 connected to the fixing member 20.

The guide bar 31 may be formed as a pair, and the guide bar is engaged with the vertical plates 13 and 14 of the base frame with nuts N while penetrating through the fixing 20 member and the moving member 30.

The moving member 30 is movably disposed to the base frame 10 apart from the fixing member 20 by a predetermined distance, and a positioning member 40 is disposed between the fixing member 20 and the moving member 30 (referring to FIG. 5).

A stopper 45 is disposed at the other vertical plate 14 of the base frame 10 for limiting movement of the moving member 30.

The stopper 45 may be a stopping bolt 46 engaged with the other vertical plate 14 of the base frame 10 for limiting movement of the moving member 30. An elastic member 50 is disposed between to the other vertical plate 14 of the base frame 10 and the moving member 30 for elastically supporting the moving member 30.

The elastic member 50 is disposed to the guide bar 31 between the other vertical plate 14 of the base frame 10 and the moving member 30, and may be a compression coil spring.

That is, one end of the elastic member 50 is supported by the other vertical plate 14 of the base frame 10 and the other end of the elastic member 50 is supported by the moving member 30.

The first electrode plate 60 is electrically insulated from the fixing member 20 and disposed on the fixing member 20, and a first disposing groove 61 is formed to the first electrode plate 60 for a welding wire, for example, the first welding wire W1, to be disposed thereto.

The first electrode plate 60 is supplied electrical power and may be fixed to the fixing member 20 by a bolt as an engaging means.

The second electrode plate 70 is electrically insulated from the moving member 30 and is disposed on the fixing member 20, and a second disposing groove 71 is formed to the second electrode plate 70 for a welding wire, for example, the second welding wire W2, to be disposed thereto.

The second electrode plate 70 is supplied electrical power and may be fixed to the moving member 30 by a bolt as an engaging means.

The first and second electrode plates 60 and 70 may be respectively disposed on upper parts of the fixing member 20 and moving member 30 that are apart from each other.

The first welding wire W1 disposed on the first disposing groove 61 and the second welding wire W2 disposed on the second disposing groove 71 may contact each other between the fixing member 20 and the moving member 30.

When the first and second welding wires W1 and W2 are contacted and the first and second electrode plates 60 and 70 are supplied with electric power, the wires W1 and W2 are connected by electrical resistance heating.

Each clamper 80 clamps each of the first and second welding wires W1 and W2 disposed on the first and second electrode plates 60 and 70, respectively.

That is, the clamper 80 fixes the first and second welding wires W1 and W2 disposed on the first and second disposing grooves 61 and 71 to the first and second electrode plates 60 and 70, respectively.

The clampers 80 are disposed to the first and second electrode plates 60 and 70, respectively. The clampers 80 include clamping levers 81 hingedly connected to the first and second electrode plates 60 and 70, respectively, and clamping members 83 hingedly connected to the clamping levers 81, respectively, and pressing the first and second welding wires W1 and W2 disposed on the first and second disposing grooves 61 and 71.

When the clamping lever 81 of the clamper 80 is rotated in one direction, the clamping member 83 also rotates in one direction to press the first and second welding wires W1 and W2 disposed on the first and second disposing grooves 61 and 71, respectively.

When the clamping lever 81 of the clamper 80 is rotated in the opposite direction, the clamping member 83 also rotates in the opposite direction to release the first and second welding wires W1 and W2 disposed on the first and second disposing grooves 61 and 71, respectively.

In the exemplary embodiment of the present exemplary embodiment, the power supplier 90 is electrically connected to the first and second electrode plate 60 and 70 and supplies electric power.

The power supplier 90 may be controlled by a switch (not shown), and may be electrically connected to the first and second electrode plate 60 and 70 by an electrical line (not shown).

Hereinafter, referring to FIG. 6 to FIG. 11, operations of the device for connecting welding wires for a $CO_2$ gas welding 100 according to the exemplary embodiment of the present invention will be described.

Figure 6:
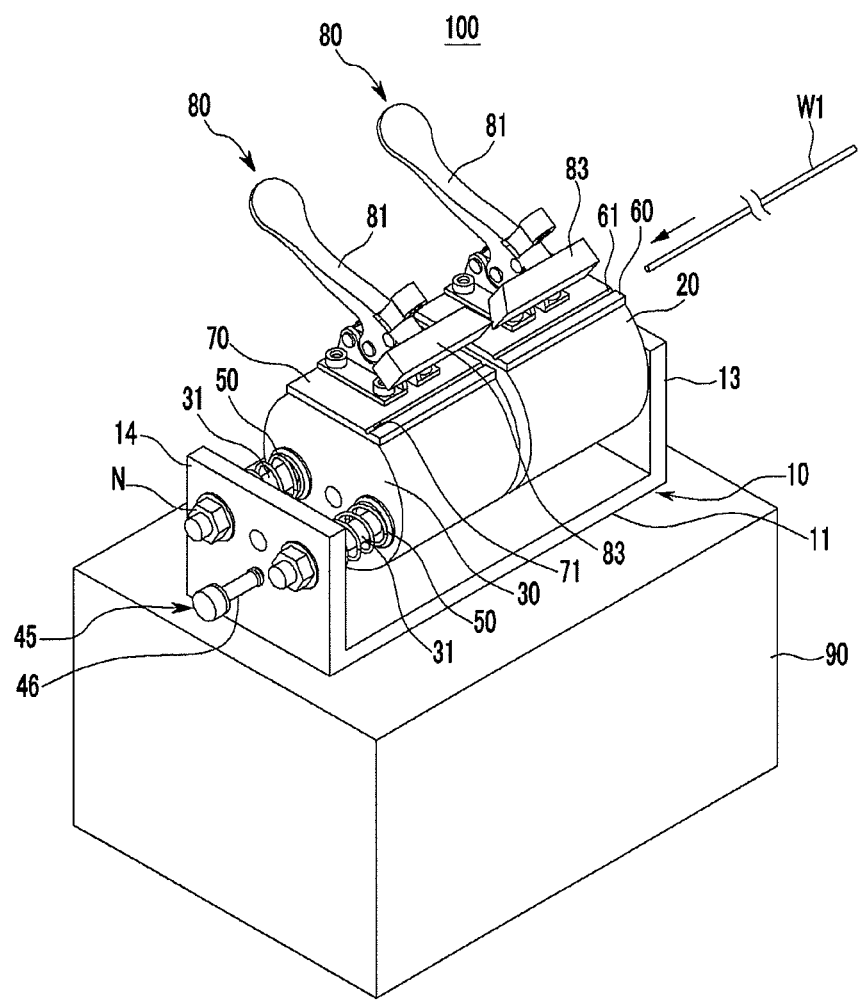
FIG. 6 to FIG. 11 are drawings showing operations of a device for connecting welding wires for a $CO_2$ gas welding apparatus according to an exemplary embodiment.

As shown in FIG. 6, the clamper 80 is released, and then the first welding wire W1 is disposed on the first disposing groove 61 of the first electrode plate 60.

The fixing member 20 is positioned apart by a distance from the moving member 30 by the positioning member 40, and the end of the first welding wire W1 is positioned between the first and second electrode plates 60 and 70.

Figure 7:
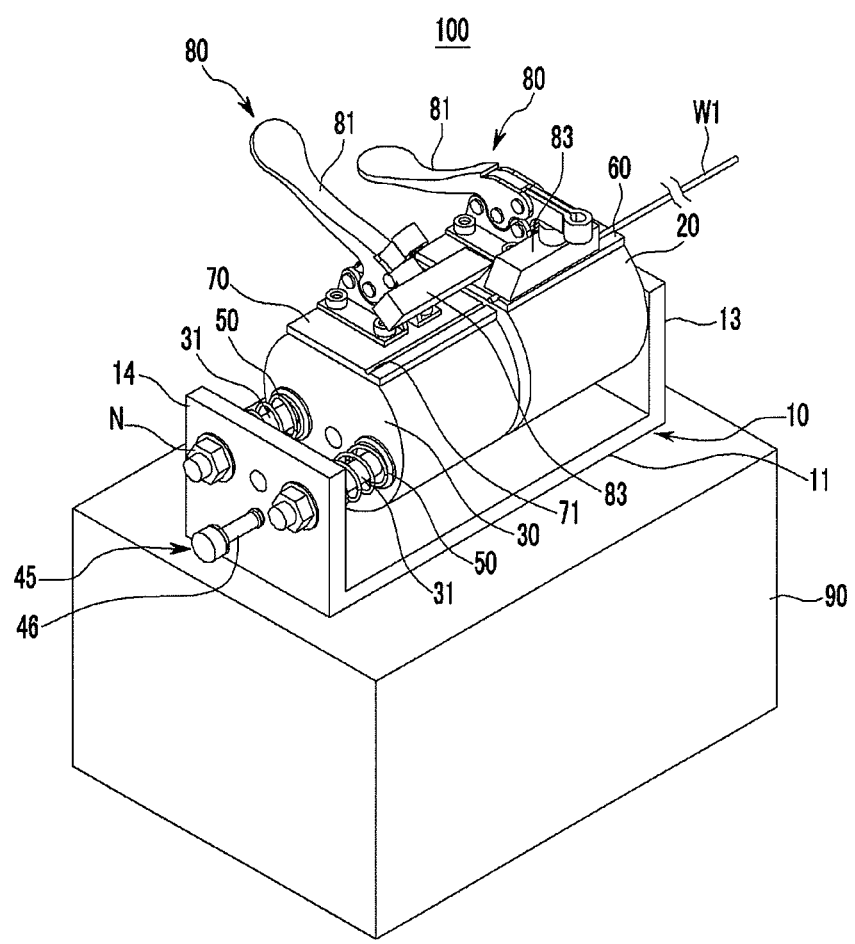
Figure 8:
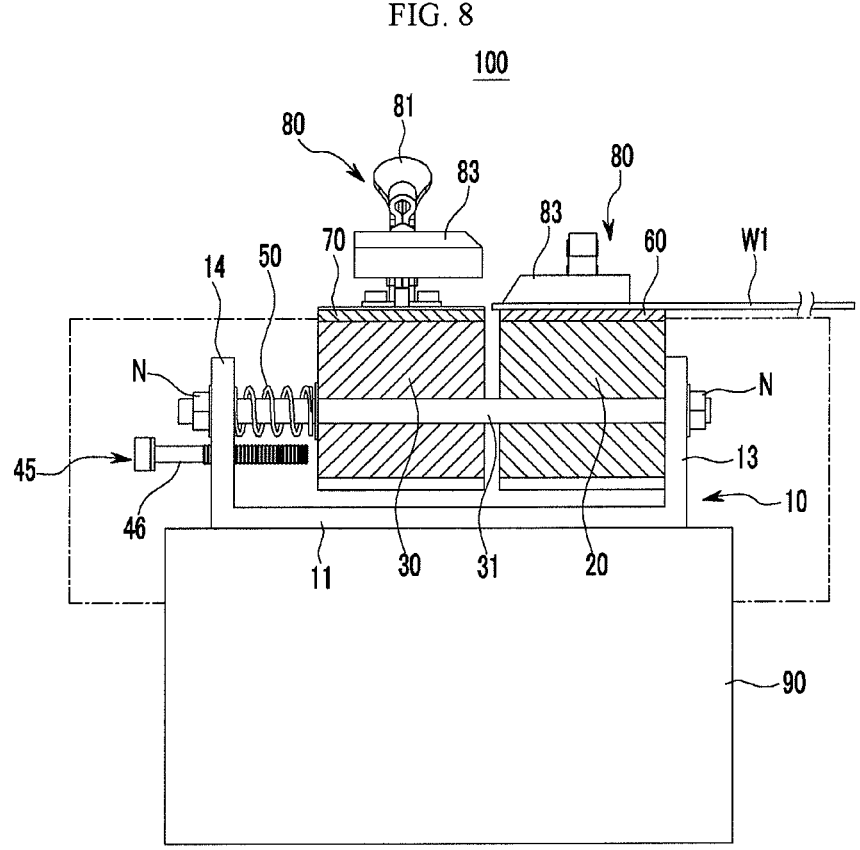

Then, as shown in FIG. 7 and in FIG. 8, the clamping lever 81 of the clamper 80 is rotated in one direction by a worker for the clamping member 83 to clamp the first welding wire W1 disposed on the first disposing groove 61 of the first electrode plate 60.

Figure 9:
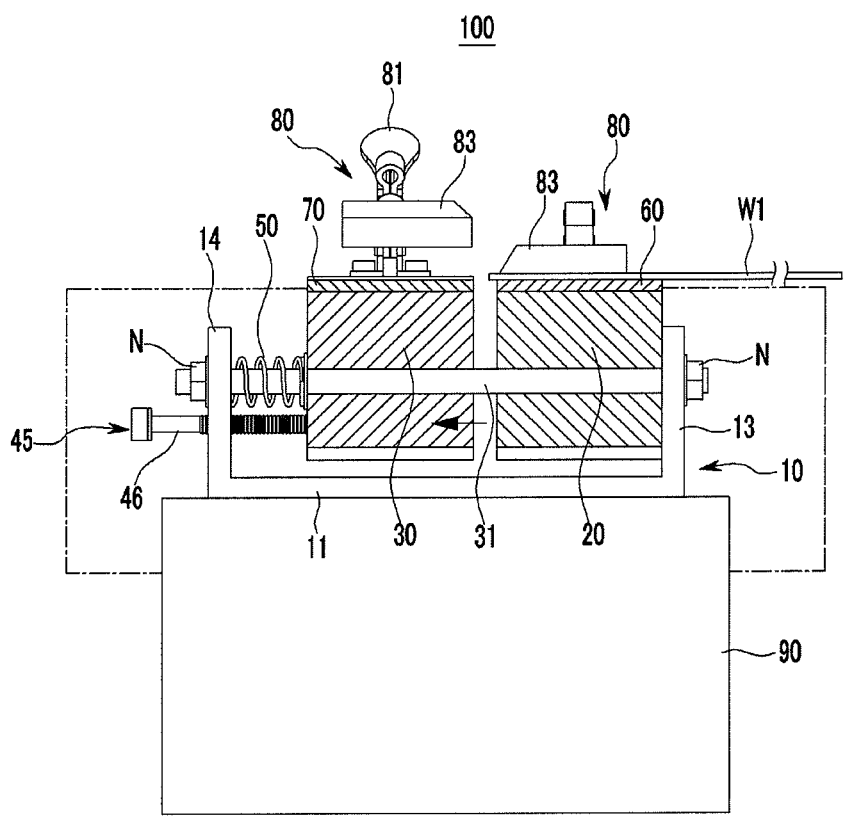

Then, as shown in FIG. 9, the moving member 30 is moved leftward as directed by an arrow in the drawing by a worker. The moving member 30 is moved along the guide bar 31 during supported by the elastic member 50.

In this case, the stopper 45 (the stopping bolt 46) disposed to the base frame 10 limits movement of the moving member 30.

Figure 10:
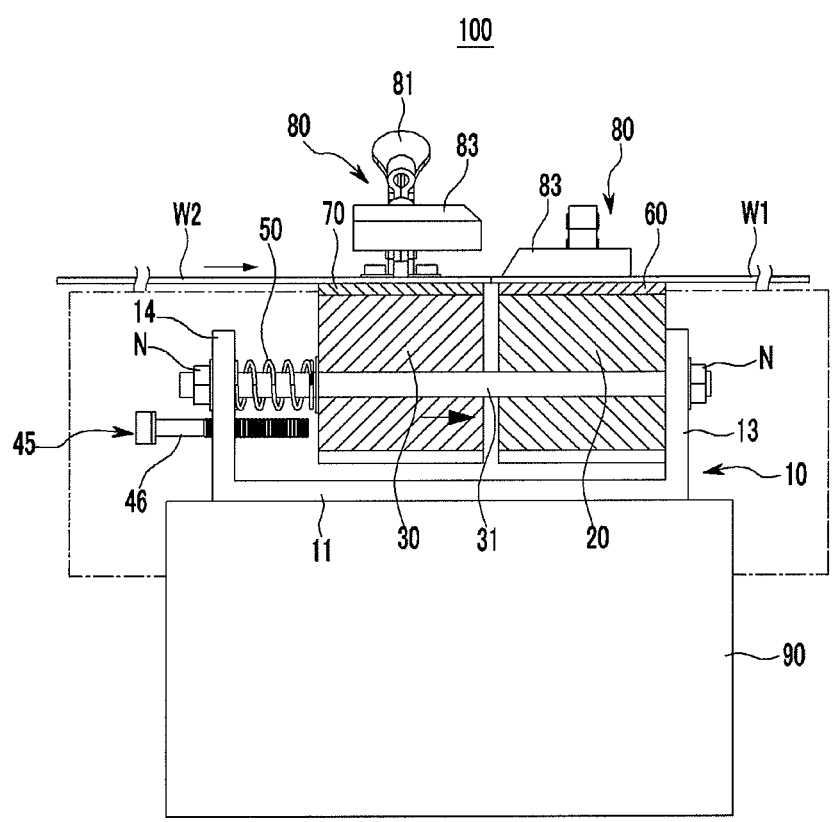

Then, as shown in FIG. 10, the second welding wire W2 is disposed on the second disposing groove 71 of the second electrode plate 70 and the clamper 80 clamps the second welding wire W2.

In this case, the end of the second welding wire W2 is positioned between the first and second electrode plates 60 and 70.

When the moving member 30 is released, the moving member 30 clamping the second welding wire W2 by the clamper 80 moves rightward in the drawing by elastic restoring force of the elastic member 50, so that the ends of the first welding wire W1 and the second welding wire W2 are in contact.

Figure 11:
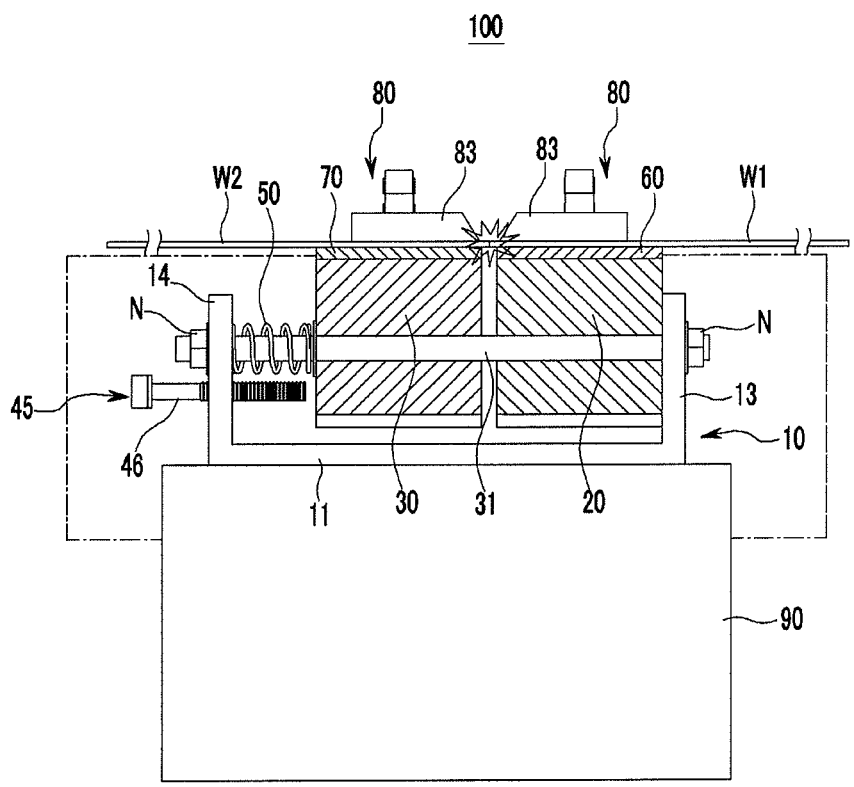

As shown in FIG. 11, when the power supplier 90 supplies electric power to the first and second electrode plates 60 and 70, the electric power is supplied to the first and second welding wires W1 and W2 through the first and second electrode plates 60 and 70, respectively, and thus the ends of the first and second welding wires W1 and W2 are connected by electrical resistance heating.

As described above, the device for connecting welding wires for a $CO_2$ gas welding device 100 according to the exemplary embodiment of the present invention may connect the old welding wire W1 and the new welding wire W2.

In the above description, although the old welding wire W1 and the new welding wire W2 are denoted as W1 and W2, the opposite may also be possible.

When the old welding wire W1 is consumed and replacement is required, the remained used wire does not need to be discarded and thus unnecessary consumption of the welding wire and welding cost may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for connecting welding wires, comprising:
a base frame;
first and second electrode plates that are disposed apart from each other on the base frame and including disposing grooves to which a first wire and a second wire are respectively disposed;
clampers that are disposed to each electrode plate and that clamp the first wire and the second wire disposed to the disposing grooves, respectively;
a fixing member that is electrically insulating is connected to the first electrode plate and is fixed to the base frame, and the first electrode plate is disposed thereon; and
a moving member that is electrically insulating is connected to the second electrode plate and is movably disposed to the base frame apart from the fixing member, and the second electrode plate is disposed thereon.

2. The device for connecting welding wires of claim 1, wherein the device further comprises a power supplier supplying electric power to each electrode plate,
   wherein the first wire and the second wire are connected by electrical resistance heating through the electric power supplied from the power supplier.

3. The device for connecting welding wires of claim 1, wherein each end of the first wire and the second wire contact each other between the fixing member and the moving member.

4. The device for connecting welding wires of claim 1, wherein the fixing member is fixed to the base frame by an engage bolt.

5. The device for connecting welding wires of claim 1, wherein the moving member is movable along at least one guide bar connected to the fixing member.

6. The device for connecting welding wires of claim 5, wherein the guide bar is engaged to the base frame penetrating through the fixing member and the moving member.

7. The device for connecting welding wires of claim 5, wherein the moving member is disposed apart by a predetermined distance from the fixing member by a positioning member disposed between the moving member and the fixing member.

8. The device for connecting welding wires of claim 7, wherein:
   an elastic member is disposed between the base frame and the moving member for elastically supporting the moving member; and
   the elastic member is disposed to the guide bar.

9. The device for connecting welding wires of claim 8, wherein a stopper is disposed to the base frame for limiting movement of the moving member.

10. The device for connecting welding wires of claim 9, wherein the stopper is a stopping bolt engaged to the base frame.

11. A device for connecting welding wires, of which the wires include a first wire and a second wire, comprising:
   a base frame;
   a fixing member fixed to the base frame;
   a moving member that is movably disposed to the base frame apart from the fixing member;
   a first electrode plate that is electrically insulating is connected to the fixing member and disposed on the fixing member and that includes a first disposing groove into which one of the wires is disposed;
   a second electrode plate that is electrically insulating is connected to the moving member and disposed on the moving member and that includes a second disposing groove into which the other of the wires is disposed;
   clampers that are disposed to each electrode plate and that clamp each wire disposed to each disposing groove;
   a positioning member disposed between the moving member and the fixing member for maintaining the moving member apart by a distance from the fixing member; and
   an elastic member that is disposed between the base frame and the moving member for elastically supporting the moving member,
   wherein the first wire and the second wire are connected by electrical resistance heating through supplied electric power from a power supplier.

12. The device for connecting welding wires of claim 11, wherein a stopper is disposed to the base frame for limiting movement of the moving member.

* * * * *